May 4, 1948.    E. L. SIMPSON    2,440,812
CRANKSHAFT LUBRICANT PURIFYING MEANS
Filed April 18, 1945

Ernest Leslie Simpson
INVENTOR.

BY Edwin C. McRae
R. G. Harris
Attorneys

Patented May 4, 1948

2,440,812

UNITED STATES PATENT OFFICE 2,440,812

CRANKSHAFT LUBRICANT PURIFYING MEANS

Ernest Leslie Simpson, Riverside, Ontario, Canada, assignor to Ford Motor Company, Dearborn, Mich., a corporation of Delaware Application April 18, 1945, Serial No. 588,915

3 Claims. (Cl. 184—6)

This invention relates to crankshafts of the kind having incorporated in them lubricating passages or ducts for the purpose of delivering liquid lubricant to the main journals and crank pins.

The object of the invention is to provide a simple and inexpensive means for automatically trapping and removing from the circulating lubricant as many as possible of the particles of iron, steel or other solid matter heavier in weight than the lubricant and whose removal from circulation will reduce wear at crank pin bearing surfaces lubricated by the engine lubricant.

The invention consists in the construction and arrangement of elements hereinafter described and, more particularly, pointed out in the appended claims.

Referring now to the accompanying drawings which illustrate by way of example, certain convenient forms of the invention:

Figure 1:
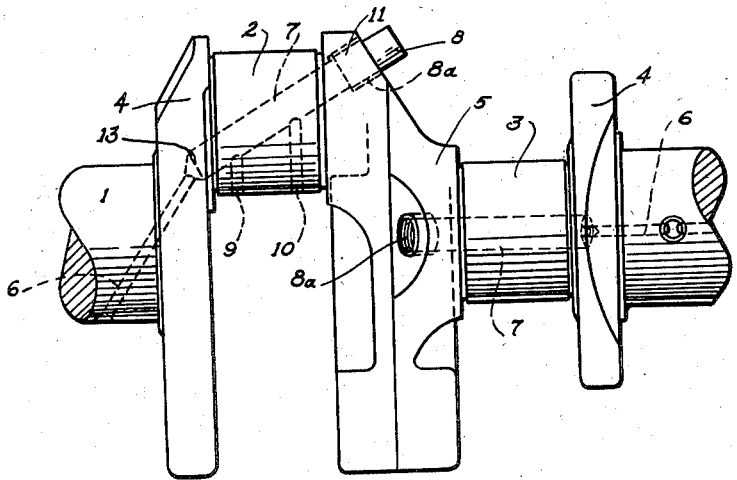
Figure 1 is an elevation of part of a crankshaft equipped with the invention.
Figure 2:
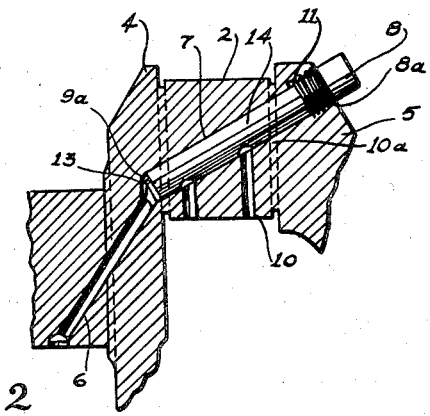
Figure 2 is a longitudinal section of part of Figure 1.

In Figures 1 and 2 the crankshaft is shown as comprising a journal 1 and crank pins 2 and 3, and webs or cheeks 4 and 5. A straight liquid lubricant inlet bore 6 is open at one end where it meets the cylindrical surface of the journal 1 and extends into the cheek 4 at an acute angle to the vertical. The other end of the bore 6 communicates with a sediment chamber 7, the junction being preferably disposed in the cheek 4.

The sediment chamber 7 consists of a straight bore which is inclined at an angle to the horizontal axis and which extends through part of the cheek 4, the crank pin 2 and the web 5. The chamber 7 is open where it meets the outer surface of the web 5.

The sediment chamber 7 is preferably of a much larger diameter than the inlet bore 6 and is provided at its open end with suitable removable closure means, such as a plug 8 screwed into a tapped opening 8a for the purpose of closing the sediment chamber when the crankshaft is in operation.

In Figures 1 and 2 are shown two outlet lubricant bores 9 and 10 which are open at the surface of the crank pin and which extend into the crank pin to communicate with the sediment chamber 7. Two such bores are shown, by way of example, but any suitable number of outlet bores may be provided to suit the requirements of each particular crankshaft.

The sediment chamber 7 may also be provided with a dowel hole or recess 11, for a purpose to be later described.

Similar passages 6, 7, 9 and 10 and associated elements are provided in connection with the crank pin 3 and any other crank pins forming part of the crankshaft.

Figure 4:
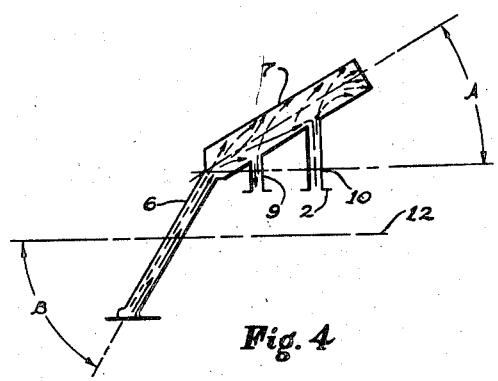
Figure 4 is a diagram indicating approximately the flow of the lubricant and sediment.

The action of the invention is illustrated diagrammatically in Figure 4 in which the elements of the invention are indicated by the same reference numerals as in the other figures. The lubricant which is pumped through the bearing (not shown) in which each journal 1 is mounted, travels through the passage 6 to the sediment chamber 7 and then to the bores 9 and 10, as indicated by the full-line arrows. Any particles of metal or other foreign material heavier in weight than the lubricant, travel with the lubricant as far as the axis of rotation 12. When this axis is crossed, centrifugal force, due to the rotation of the crankshaft, begins to act upon the lubricant and its suspended foreign matter. The foreign matter being heavier in density will be thrown out against the outer walls of the passage 6 and sediment chamber 7, as indicated by the dotted line arrows. The sediment, which has been thrown outwardly will accumulate and ultimately form a packed mass in the sediment chamber 7.

The outlet bores 9 and 10 are preferably arranged on the inner side of the crank pin, as shown, so that any heavy sediment formed on the surface of the crank pin 2 and collected in the bores 9 and 10 will be thrown out into the sediment chamber against the pressure of the lubricant as indicated by the dotted arrows leading from the outlet passages into the chamber 7. The crankshaft, after a period of rotation, may come to a stop at a point where the sediment chamber 7 is vertically above the crankshaft axis 12. In this event, if the sediment chamber were upright, there would be a tendency for loose particles of its contained sediment to fall back into the lubricant passages 6. By inclining the chamber 7 a safeguard is provided against such a contingency, because being inclined at all times, gravity cannot act directly upon the sediment to withdraw it from the bore. The tendency of the sediment to return from the sediment chamber to the inlet bore 6 increases as the size of the angle A increases from 0° to 90°, and decreases as the angle A decreases from 90° to 0° (see Fig. 4). According to one convenient construction the angle A is about 30° and the angle B, between the axis 12 and the bore 6, is slightly less than 78°, but these angles may be varied considerably to suit the requirements of each crankshaft.

Additional safeguard against the backing up of the sediment is also provided by the annular shoulder 13 formed at the junction of the bore 6 and the sediment chamber 7, due to the marked difference in their diameters. If desired, the return movement of the sediment might be still more positively prevented by means of a non-return valve at the junction of the passages 6 and 7.

The compact plug of sediment which eventually forms in the chamber 7, would be quite difficult to extract and convenient means may be provided to facilitate this operation. A tubular member or cartridge may be used for this purpose. The cartridge fits loosely in the sediment chamber 7.

Figure 3:
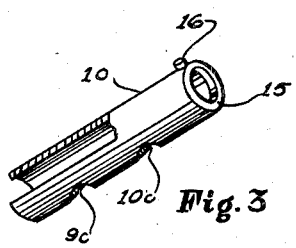
Figure 3 is an isometric view, partly in section, of a sediment cartridge which is preferably used in connection with the invention.

The cartridge 14 consists of a tube of metal or other suitable material. The lower end of the cartridge 14 is entirely open, while the opening at the upper end is preferably formed with rim or flange 15 at right angles to the axis of the cartridge as shown in Figure 3. The object of this rim is to provide a means for facilitating the removal of the cartridge for cleaning. The tubular wall of the cartridge in this case, is also provided with two holes 9a and 10a which register with the lubricant bores 9 and 10, respectively, and permit the passage of liquid lubricant between the sediment chamber and the outlet bores 9 and 10. The number of such holes would of course be equal to the number of outlets in the crank pin, or an elongated slot may be provided to accommodate a multiplicity of such lubricant bores. After the cartridge is inserted into the sediment chamber, it is held in position by the closure plug 8.

The drawings illustrate a tapered plug 8 for the sediment chamber but when a cartridge is to be used in the sediment chamber, a cylindrical plug would preferably be used.

A dowel pin 16 projects from the cartridge as shown in Figure 3 and this pin fits into the dowel hole 11 for the purpose of positioning the cartridge to provide registration between the holes 9a and 10a and the bores 9 and 10, respectively.

When the cartridge 14 is employed the sediment packs against the wall of the cartridge instead of against the wall of the sediment chamber itself so that the plug of sediment is trapped within the cartridge. For the purpose of cleaning, the cartridge is removed from the chamber 7, cleaned and replaced, or a fresh cartridge may be inserted into the sediment chamber, while the plugged cartridge is being cleaned.

Figure 5:
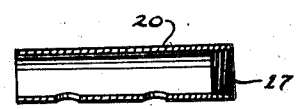
Figure 5 shows a side elevation, partly in section, a slightly modified form of sediment cartridge.

The means for facilitating the removal of the sediment cartridge may be modified in many ways as will be readily understood. For example, as indicated in Figure 5 the outer end of the cartridge 20 may be internally tapped, as at 17, to provide a thread which can be engaged by any suitable screwthreaded tool by means of which the cartridge can be extracted from the sediment chamber 7 when the plug 8 is to be removed.

The foregoing description and accompanying drawings are given by way of example only, and any modifications within the scope of the appended claims can be made without departing from the spirit of the invention.

What I claim is:

1. A crankshaft, comprising journals, a crank pin and interjacent webs wherein a lubricant passage extends from a journal surface to the crank pin surface, said passage comprising an inlet part which extends from an open end at the face of the journal and projects into the adjacent web, a sediment chamber part of larger cross section, communicating with the inner end of said inlet part and extending through the crank pin and through the next web, obliquely to the longitudinal axis of said crankshaft, and an outlet part of smaller cross section than the sediment chamber communicating at one end with the sediment chamber and at the other end opening at the surface of the crank pin and substantially normal to said longitudinal axis.

2. A crankshaft as claimed in claim 1 in combination with a removable sediment trapping cartridge comprising a tube open at its inner end and apertured so that its interior communicates with the outlet passage, a dowel pin being provided on the wall of said cartridge and positioned so that when the dowel pin fits into a dowel hole in the sediment chamber, the apertured part of the cartridge registers with the lubricant outlet.

3. A crankshaft as claimed in claim 1 in combination with a removable sediment trapping cartridge comprising a tube open at its inner end and apertured so that the interior of said tube communicates with said outlet passage, means effective between said cartridge and said crankshaft to maintain alignment between said aperture and said passage, and closure means for the outer end of said chamber securing said cartridge in place therein.

ERNEST LESLIE SIMPSON.

REFERENCES CITED

The following references are of record in the file of this patent:

UNITED STATES PATENTS

| Number | Name | Date |
| --- | --- | --- |
| 1,862,724 | Summers | June 14, 1932 |
| 1,868,814 | Brusg | July 26, 1932 |

FOREIGN PATENTS

| Number | Country | Date |
| --- | --- | --- |
| 609,034 | France | May 3, 1926 |